United States Patent
Sears et al.

(10) Patent No.: US 6,572,379 B1
(45) Date of Patent: Jun. 3, 2003

(54) SELF INSTRUCTION WELDING KIT

(75) Inventors: Ronald J. Sears, Worthington, OH (US); Lawrence A. Boehnlein, Chardon, OH (US); Roland Zeder, Pittsburgh, PA (US); Jennifer Zieserl, Pittsburgh, PA (US); Gregoire Eva-Aby, Pittsburgh, PA (US)

(73) Assignee: Lincoln Global, Inc., Monterey Park, CA (US)

( * ) Notice: Subject to any disclaimer, the term of this patent is extended or adjusted under 35 U.S.C. 154(b) by 31 days.

(21) Appl. No.: 09/847,206

(22) Filed: May 3, 2001

(51) Int. Cl.[7] .............................................. G09B 25/00
(52) U.S. Cl. ..................... 434/234; 434/219; 446/85; 206/223; 206/232
(58) Field of Search ................................ 434/219, 234, 434/372, 373; 446/85, 87, 88; 206/223, 232, 576, 577, 582

(56) References Cited

U.S. PATENT DOCUMENTS

| | | | | |
|---|---|---|---|---|
| 4,931,018 A | * | 6/1990 | Herbst et al. ................. | 345/10 |
| 5,082,166 A | * | 1/1992 | Matsuo et al. ............... | 228/169 |
| 5,647,181 A | * | 7/1997 | Hunts .......................... | 312/111 |
| 5,823,785 A | * | 10/1998 | Matherne, Jr. .............. | 434/234 |
| 6,089,940 A | * | 7/2000 | Farrar .......................... | 446/34 |

* cited by examiner

*Primary Examiner*—Kien T. Nguyen
(74) *Attorney, Agent, or Firm*—Fay, Sharpe, Fagan, Minnich & McKee

(57) ABSTRACT

A welding kit to provide a welder with information and instructions concerning particular types of welds and the formation of such welds. The welding kit includes a welding instruction manual and several metal sheets that include a plurality of pre-cut metal pieces. The metal pieces are used to form one or more welding projects with instructions provided by the instruction manual.

97 Claims, 8 Drawing Sheets

SELF INSTRUCTION WELDING KIT

The present invention relates to the art of welding and, more particularly, to an informational kit which educates novice and experienced welders about various welding techniques. The invention is particularly applicable to novice welders which have little, if any, experience in the art of welding; however, the invention has broader applications and can be used to educate and/or teach intermediate or experienced welders about various welding techniques.

BACKGROUND OF THE INVENTION

In the field of welding, welding techniques are typically taught to others by on the job training. Various welding trade organizations sponsor welding seminars and/or training courses to teach and/or improve the welding skills of its members. Some companies send their employers to welding trade schools. Although these various avenues of training individuals in the art of welding have been successful when training professional welders, there is little information and training available for novice, non-professional welders. Hobbyists, artists and do-it-yourself individuals purchase and use welders without ever receiving any type of training. Many of these individuals become frustrated with their lack of ability to execute a proper and/or desired weld. Other individuals that continue to weld, never learn basic welding techniques; thus, form welds of limited quality and/or variety.

Presently, welders can be purchased by individuals at automotive stores, hardware stores, and/or hobby stores. The box containing the welder typically includes limited information about the particular welder in the box. Typically, such information includes the type of welder (e.g. MIG, MAG), the type of consumable electrode used with the welder (e.g. stick, flux cored), and the output current and/or voltage of the welder. The box may also include information on the various accessories included with the welder and may also include information on the recommended uses of the welder. Contained in the box is typically an instruction manual including information on the contents of the box, basic information about the features of the welder, basic safety information when operating the welder, and information concerning troubleshooting and/or the company to contact to repair the welder. The instruction manual is typically written for individuals with prior welding experience; thus, information concerning the operation of the welder to form a particular weld is limited or non-existent.

In view of the present state of instructional resources for novice welders, there is a need for a welding instruction kit which provides information on how to use a welder, information on how to form various types of welds, and/or practice exercises to enable individuals to practice or improve their welding skills.

SUMMARY OF THE INVENTION

The present invention is directed to a novel welding kit that provides both instructional welding information to individuals and metal workpieces to enable an individual to practice his/her welding skills. The invention is particularly directed to new users of welding equipment and will be described with reference thereto; however, the welding kit can be used by experienced welders with limited experience to one area of welding as opposed to others. The welding kit can also be used as a refresher course for experienced welders that have not utilized their welding skills for a period of time.

In accordance with one object of the present invention, there is provided a welding kit that includes a welding instruction manual and a plurality of pre-cut metal pieces. In one embodiment, the welding kit can be offered to an individual separately from a welder, or the welding kit can be included in the box with the welder. In one aspect of this embodiment, the welding kit is offered separately from the welder. In another embodiment, the welding instruction manual includes various types of information concerning the use and operation of a welder. In one aspect of this embodiment, the welding instruction manual includes information on the particular types of welders recommended for use with the welding kit. Generally, the welding kit is designed to be used with one or more introductory class welders. In one specific example, the instruction manual informs the purchaser that the welding kit is to be used with a Weld Pak 100 (MIG), Weld Pak 100 (Flux Cored), and/or a Hobby Weld, all of which are manufactured by The Lincoln Electric Company. In another aspect of this embodiment, the welding instruction manual includes 1) welding safety information, 2) information about the welding kit and/or the contents of the welding kit, 3) recommended welder settings for one or more welders used with the welder kit, 4) information on striking an arc for one or more welders, 5) information on how to set up the welder, 6) information on how to connect the workpiece to a welder, 7) information on how to set up the workpiece prior to forming a weld, 8) information on how to prepare a welding work area, 9) information about one or more types of welds, 10) information how to form one or more types of welds, 11) one or more exercises on how to practice one or more types of welds, 12) information on how to form one or more welding jigs, 13) information on the types of electrodes used with a particular welder when using the welding kit, 14) information concerning various tools and/or accessories recommended or needed to fully use the welding kit in conjunction with a welder, 15) information concerning the use of various metal sheets in the welding kit, 16) information concerning the location of various metal pieces on one or more metal sheets in the welder kit; 17) one or more templates to illustrate how certain metal pieces are to be combined and/or welding locations to weld together two or more metal pieces, 18) illustrations on how to make one or more practice projects using a plurality of metal pieces, 19) information on the location of a weld on various metal pieces when practicing welds or forming a welding project, and/or 20) information concerning sources to obtain additional welding information and/or obtaining additional projects for use with the welding kit. As can be appreciated, the welder kit can include other types of information.

In accordance with another embodiment, the welding kit includes a plurality of pre-cut metal pieces to form one or more welding projects, and/or to enable an individual to practice one or more welding techniques. In one embodiment, the welding kit includes a plurality of pre-cut metal practice pieces to enable an individual to complete one or more welding exercises for a particular type of weld. In one aspect of this embodiment, the pre-cut metal practice pieces are substantially the same shape. In another aspect of this embodiment, one or more pre-cut metal practice pieces have a different shape from one or more other pre-cut metal pieces. In another embodiment, the welding kit includes a plurality of pre-cut metal project pieces to enable an individual to form one or more practice projects. In one aspect of this embodiment, the welding kit includes a plurality of pre-cut metal project pieces to enable an individual to form a plurality of practice projects. In another aspect of this embodiment, the practice projects include, but are not limited to, a toy automobile, ornamental bookends, a toy airplane, an ornamental wine rack, an ornamental candle holder, and/or an ornamental basket.

In accordance with still another aspect of the present invention, the welder kit includes one or more metal sheets that include a plurality of pre-cut metal pieces. In one embodiment, the welding kit includes a plurality of metal sheets. In another embodiment, the metal sheets include one or more slots that at least partially define one or more pre-cut metal pieces on the metal sheet. In one aspect of this embodiment, the metal sheets include a plurality of grooves and/or slots that at least partially define a plurality of pre-cut metal pieces on the metal sheets. In one specific design, the plurality of grooves and/or slots define a majority of the perimeter of a plurality of pre-cut metal pieces. In this design, the slots sufficiently define the perimeter of one or more metal pieces to enable an individual to manually punch out the pre-cut metal pieces from the metal sheets. In another specific design, the grooves and/or slots in the metal sheets are formed by a process which includes, but is not limited to, stamping, punching, etching, laser cutting, drilling, and/or sawing.

In accordance with still yet another aspect of the present invention, the welder kit includes plurality of pre-cut metal pieces that have been stamped, punched, etched, laser cut, drilled, and/or sawed fro a metal sheet. As can be appreciated, one or more of the metal pieces can be formed from a mold. In one embodiment, one or more of the pre-cut pieces includes pre-smoothed edges.

In another aspect of this embodiment, one or more metal sheets and/or pre-cut metal pieces include an identifying mark to enable an individual to easily identify and locate the metal sheet that includes one or more metal practice pieces and/or one or more metal project pieces. In one specific design, one or more metal sheets include an identifying mark to indicate that one or more metal practice pieces are located on the metal sheet. In another specific design, one or more metal sheets include an identitying mark to indicate the location of one or more metal project pieces. In another specific design, one or more pre-cut metal pieces or project pieces includes an identifying mark to facilitate in indicating which metal piece is used with one or more welding projects.

In accordance with yet another aspect of the present invention, the welding kit includes a welding work surface. Typically, the welding work surface includes a substantially solid metal sheet. In one embodiment, the welding kit includes all the components for the welding work surface. In another embodiment, the welding kit includes only a portion of the welding work surface. Typically, the welding kit includes instructions on how to form the welding work surface when the welding work surface is not fully assembled. In still another embodiment, the substantially solid metal sheet includes an identification marking to enable an individual to easily identify or locate the solid metal sheet in the welding kit.

In accordance with still yet another aspect of the present invention, the welding kit includes one or more welding jigs. The welding jigs are used to accurately clamp one or more welding pieces in position when forming a weld between one or more welding pieces. The welding jigs can be partially or fully formed in the welding kit. In one embodiment, the welding jigs are partially pre-cut in one or more metal sheets. In this aspect of the embodiment, one or more metal sheets include a plurality of grooves and/or slots that define at least a portion of the perimeter of the metal jigs. In one specific design, the grooves and/or slots in this metal sheet allow an individual to manually punch out the metal jigs. After the metal jigs have been punched out of the metal sheet, the metal jig can then be formed into the desired shape. In another specific design, the metal jigs include one or more grooves and/or slots which facilitate in the forming of the metal jig. In another aspect of this embodiment, the one or more metal sheets include an identifying mark to enable an individual to easily identify and locate the metal sheet that includes the one or more metal jigs.

In accordance with a further aspect of the present invention, the welding kit includes one or more positioning tips. The positioning tip is designed to assist an individual in properly spacing the welding gun from a metal practice piece and/or metal project piece when forming a weld. In one embodiment, the welding tip is designed to easily attach to the end of the welding gun and extend beyond the end of the welding gun a defined distance. The defined distance facilitates in maintaining the desired wire "stickout" (i.e. length of exposed wire between the contact tip and the weld). The defined distance also facilitates in correct weld gun alignment during the formation of a weld. In one aspect of this embodiment, the positioning tip is used on welders that utilize flux cored electrodes.

The principal object of the present invention is the provision of a welding kit that provides information to an individual concerning the formation of a weld.

Another and/or alternative object of the present invention is the provision of a welding kit that includes a welding instruction manual with instructional information concerning the formation of one or more types of welds.

Still another and/or alternative object of the present invention is the provision of a welding kit that includes one or more metal pieces used by an individual to practice the formation of one or more types of Welds to make one or more practice objects and/or to form one or more metal jigs.

Yet another and/or alternative object of the present invention is the provision of a welding kit that includes one or more metal sheets, which metal sheets include one or more metal practice pieces, one or more metal project pieces and/or one or more metal jigs.

Still yet another and/or alternative object of the present invention is the provision of a welding kit that includes one or more metal sheets that allow an individual to manually punch out one or more metal practice pieces, one or more metal project pieces and/or one or more metal jigs.

A further and/or alternative object of the present invention is the provision of a welding kit that enables and instructs an individual on the formation of one or more types of welds, the formation of one or more practice objects and/or the formation of one or more metal jigs.

Still a further and/or alternative object of the present invention is the provision of a welding kit that includes a welding work surface.

Yet a further and/or alternative object of the present invention is the provision of a welding kit that includes one or more templates to facilitate in the formation of one or more practice objects.

Still yet a further and/or alternative object of the present invention is the provision of a welding kit that includes one or more metal sheets having one or more identifying marks to enable an individual to easily and conveniently locate a particular metal sheet.

Another and/or alternative object of the present invention is the provision of a welding kit that includes a welding positioning tip.

These and other objects and advantages will become apparent to those skilled in the art upon reading and following the description of the invention taken together with the accompanied drawings.

BRIEF DESCRIPTION OF THE DRAWINGS

Reference may now be made to the drawings, which illustrate various attributes of the invention wherein.

DETAILED DESCRIPTION OF THE PREFERRED EMBODIMENT

Figure 1:
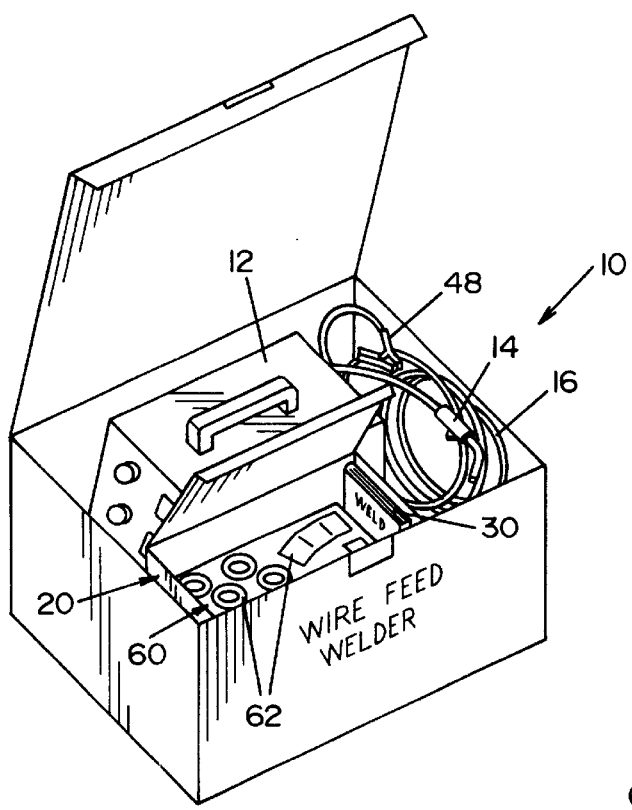
FIG. 1 is a graphical illustration of a welding kit of the present invention packaged with a welder.
Figure 2:
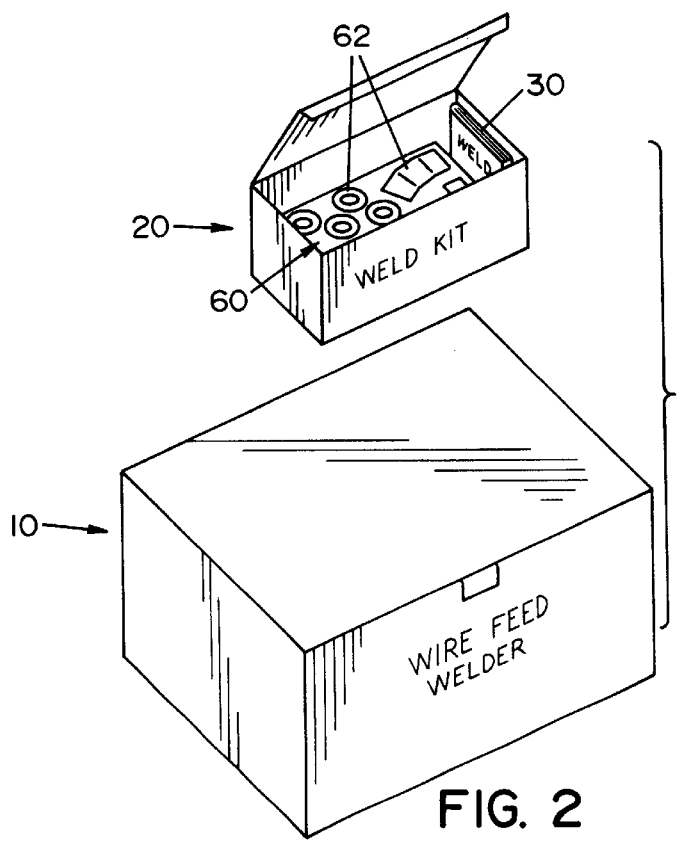
FIG. 2 is a graphical illustration of a welding kit of the present invention packaged individually and separately from a welder.

Referring now to the drawings which illustrate one or more preferred embodiments of the invention, and do not limit the same, there is shown in FIGS. 1 and 2 a welding kit 20 in accordance with the present invention. As shown in FIG. 1, a welding system 10 is provided which includes a welder 12 and a welding kit 20. Also included with the welding system is a welding gun 14 and power cable 16. Other standard welding accessories may also be included with welder 12.

Referring now to FIG. 2, welding kit 20 is packaged separately from welding system 10. The welding kit can thus be sold in combination with a new welder as shown in FIG. 1 or sold as a separate accessory from the welder as shown in FIG. 2.

Welder 12 is typically an introductory level welder or low powered welder; however, the welder is not limited to such welders. Non-limiting examples of low powered welders used with welding kit 20 include Weld Pak 100 (MIG), Weld Pak 100 (Flux Core) and Hobby Weld. These welders are all manufactured by The Lincoln Electric Company.

As shown in FIGS. 1 and 2, welding kit 20 includes one or more metal sheets 60 and an instruction manual 30. The instruction manual provides important information concerning welding and how to use the welding kit. Specifically, the instruction manual includes, but is not limited to, information pertaining to welding safety information, information about the welding kit and/or the contents of the welding kit, recommended welder settings for one or more welders used with the welder kit, information on striking an arc for one or more welders, information on how to set up the welder, information on how to connect the workpiece to a welder, information on how to set up the workpiece prior to forming a weld, information on how to prepare a welding work area, information about one or more types of welds, information how to form one or more types of welds, one or more exercises on how to practice one or more types of welds, information on how to form one or more welding jigs, information on the types of electrodes used with a particular welder when using the welding kit, information concerning various tools and/or accessories recommended or needed to fully use the welding kit in conjunction with a welder, information concerning the use of various metal sheets in the welding kit, information concerning the location of various metal pieces on one or more metal sheets in the welder kit; one or more templates to illustrate how certain metal pieces are to be combined and/or welding locations to weld together two or more metal pieces, illustrations on how to make one or more practice projects using a plurality of metal pieces, information on the location of a weld on various metal pieces when practicing welds or forming a welding project, and/or information concerning sources to obtain additional welding information and/or obtaining additional projects for use with the welding kit. As can be appreciated, the instruction manual can include other types of information. The instruction manual is designed to provide sufficient information to a welding novice to execute a weld using welder 12.

Metal sheets 60 in the welding kit are made of 14-gauge steel. As can be appreciated, other steel gauges can be used. The instruction manual provides recommended initial settings for various types of welders recommended for use with this welding kit. As can be appreciated, the settings may need to be further adjusted to obtain optimum welding parameters.

Figure 8:
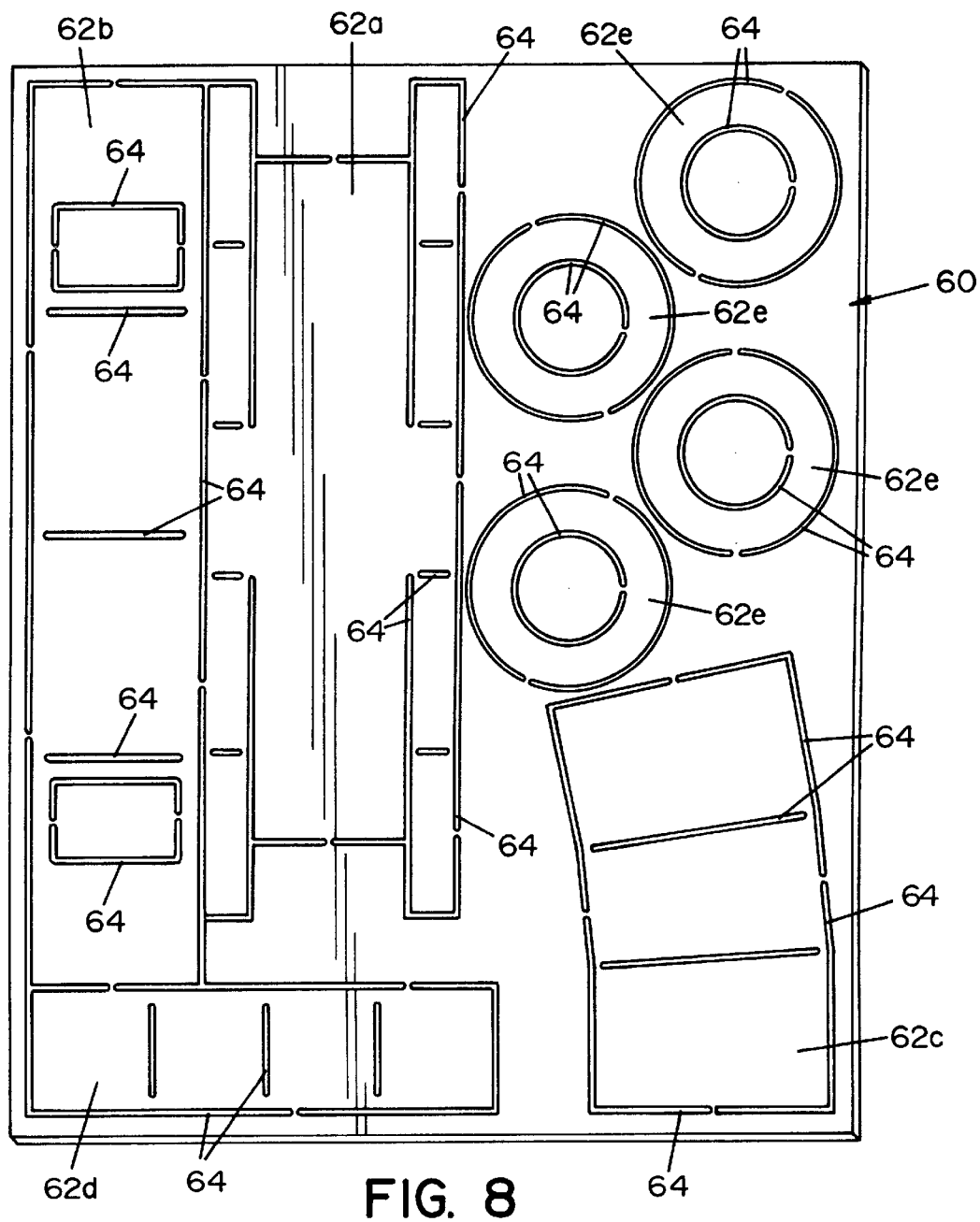
FIG. 8 is a perspective view of a metal sheet illustrating a plurality of metal project pieces partially pre-cut in the metal sheet.
Figure 9:
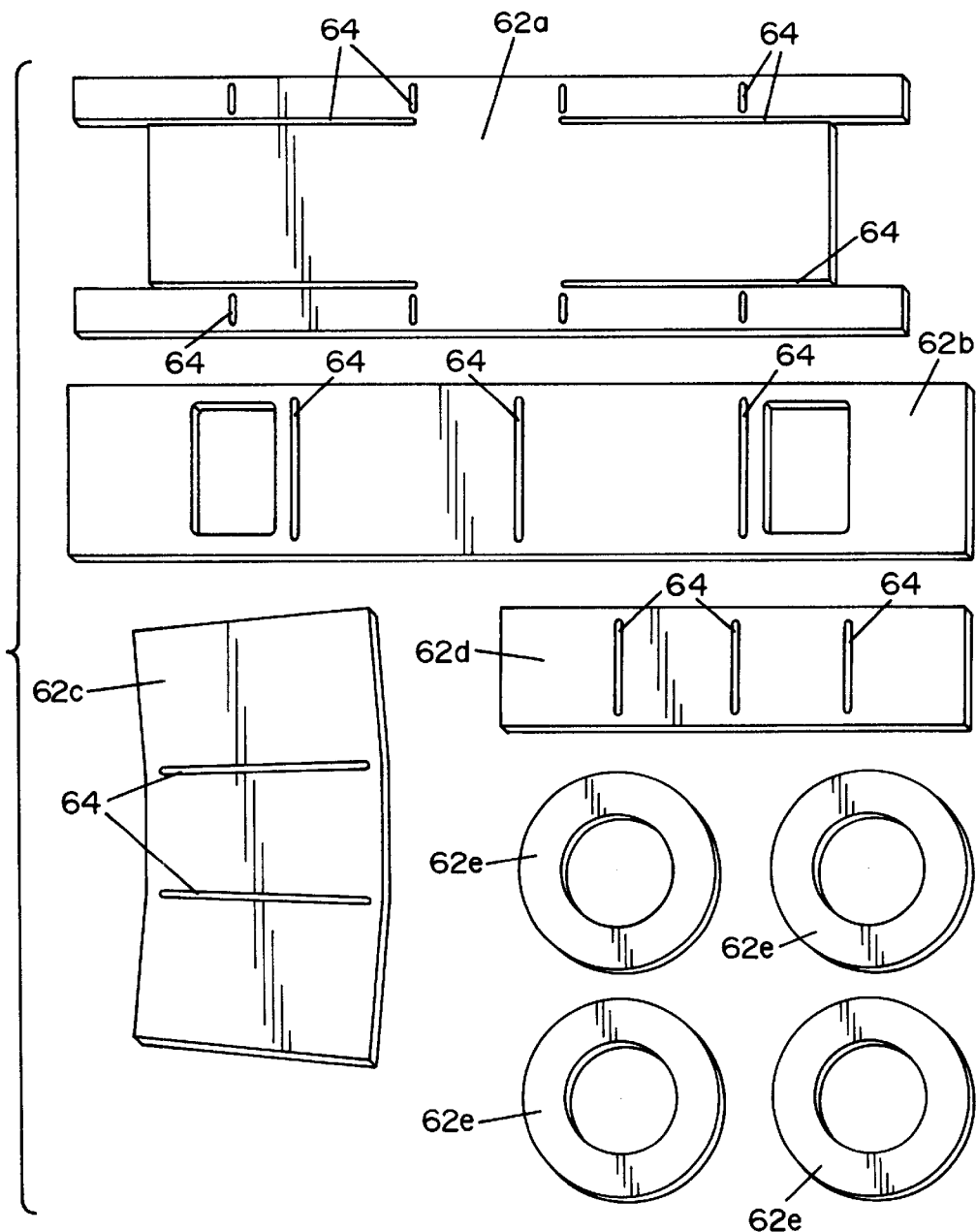
FIG. 9 is a perspective view of a plurality of metal project pieces that will form a toy automobile.

Referring now to FIGS. 8–9, metal sheets 60 include a plurality of metal pieces 62. The metal pieces are partially defined by slots 64 that have been cut by laser into the metal sheet. The partially pre-cut metal pieces 62 can be punched out manually from the metal sheet by an individual as shown in FIG. 9. The punched out metal pieces are generally filed, sanded, grounded, or otherwise smoothed to remove any rough edges; however, such smoothing is not required. FIG. 8 illustrates the metal pieces prior to being punched out, and FIG. 9 illustrates punched out metal pieces 62*a–e*. As can be appreciated, the metal pieces can be pre-punched or cut. Such pre-punched or precut pieces can also be finished to remove rough edges prior to being packaged in the welding kit. Metal pieces 62*a–e* can be formed into a toy automobile as will be discussed below.

Figure 3:
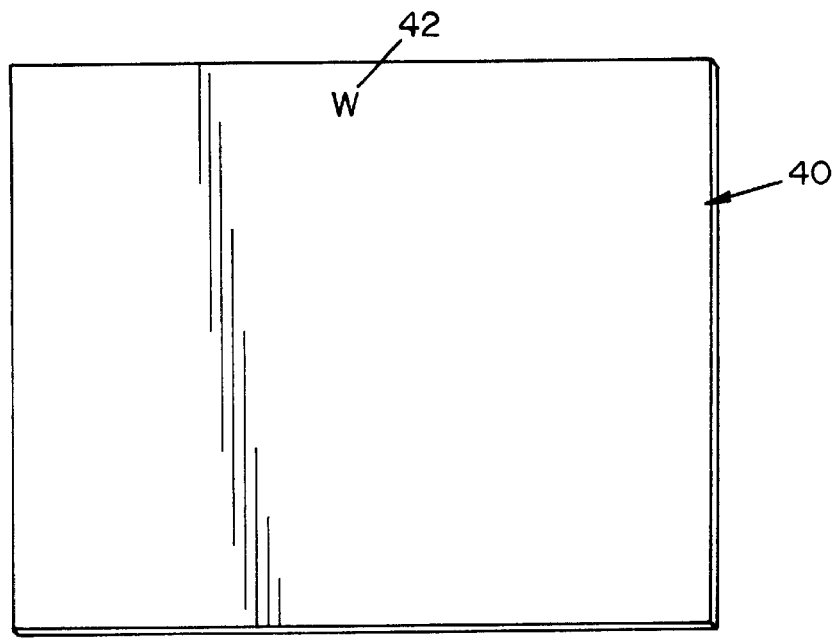
FIG. 3 is a perspective view of a solid metal sheet that forms at least a part of a welding work surface.
Figure 4:
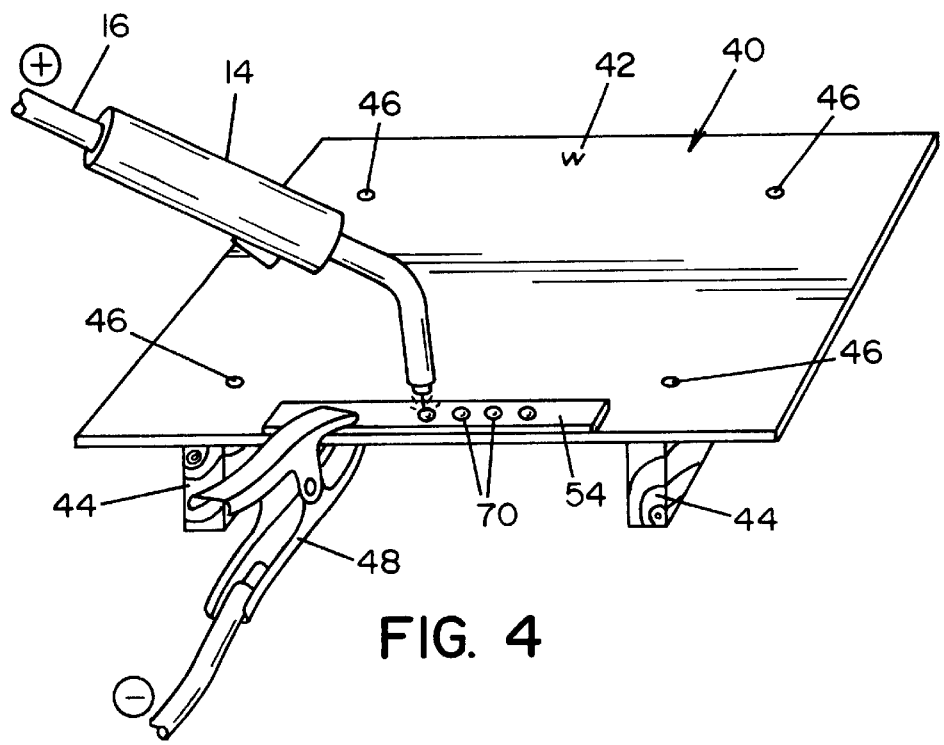
FIG. 4 is a perspective view of an assembled work surface for welding.

Referring now to FIG. 3, there is shown a metal work surface 40. Metal work surface 40 includes a marking 42 in the shape of a "W" to conveniently identify the metal work surface in the welding kit. Generally, the metal work surface is a 14-gauge rectangular metal sheet; however, other metal gauges and/or shapes can be used. The metal work surface can be used as the work surface without any modification. Typically, the metal work surface is mounted on top of two or more wood blocks 44 and secured thereto by nails, bolts or the like 46 as shown in FIG. 4. Typically, the region about the nails, bolts or the like is recessed so as to maintain a relatively smooth surface about the nails, bolts or the like 46. The wood blocks may or may not be included in the welding kit. Modification of the metal work surface and/or maintenance of the metal is typically included in instruction manual 30. The metal work surface can be used to practice the formation of welds and/or to assemble an object. As shown in FIG. 4, a metal practice piece 54 is held to the metal work surface by a ground clamp 48 while the user applies a series of weld beads 70 to the metal practice piece.

Figure 5:
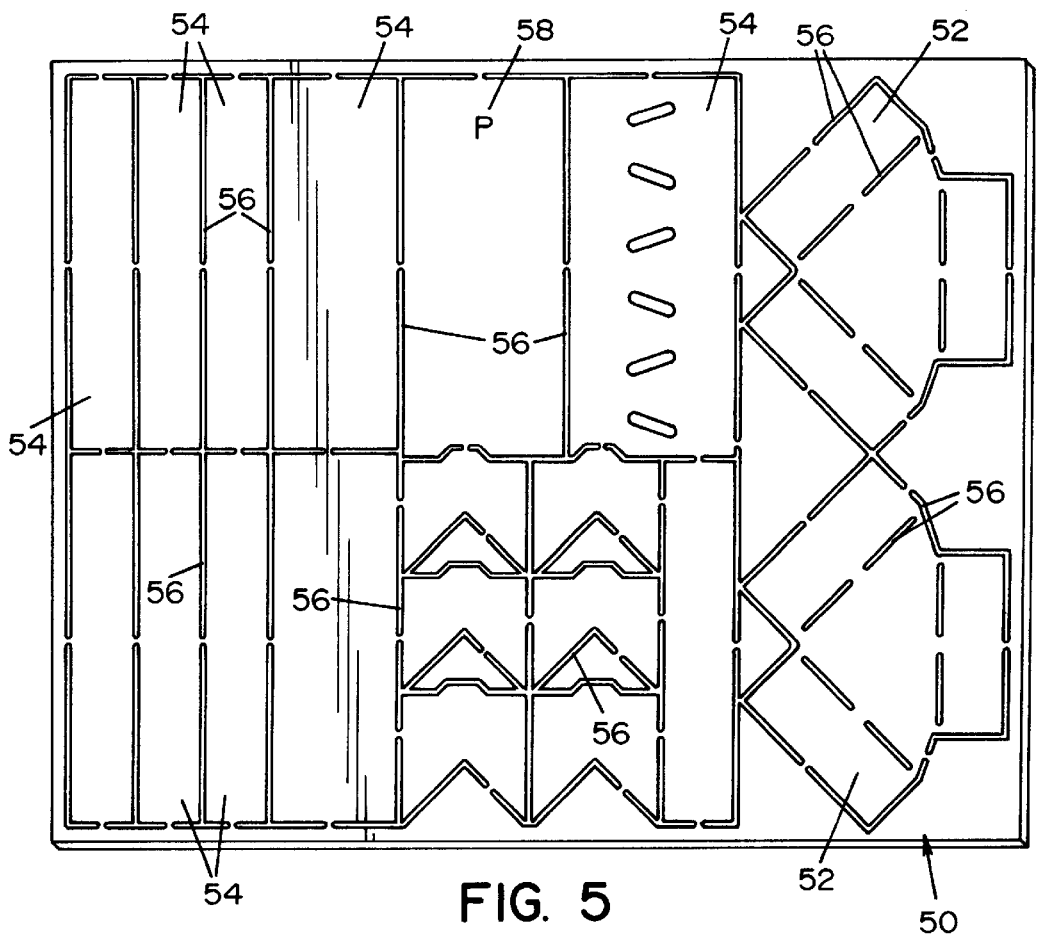
FIG. 5 is a perspective view of a metal sheet illustrating a plurality of metal practice pieces and metal jigs partially pre-cut in the metal sheet.
Figure 6:
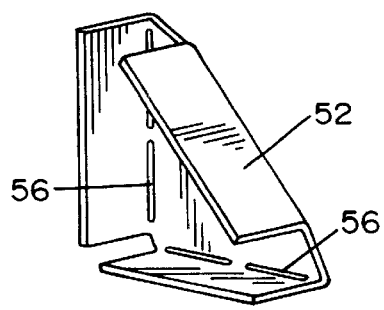
FIG. 6 is a perspective view of a metal jig bent into final form.
Figure 7:
FIG. 7 is a perspective view of a metal practice piece.

Referring now to FIG. 5, there is shown a practice metal sheet 50 that includes a plurality of laser cut slots 56. Slots 56 partially define two metal jigs 52 and several metal practice pieces 54. The practice metal sheet also includes a marking 58 in the shape of a "P" to conveniently identify the metal sheet that contains the metal jigs and metal practice pieces. Both the metal jigs and metal practice pieces are designed to be manually punched from practice metal sheet 50. FIG. 7 illustrates one of the punched out metal practice pieces. The metal jigs and/or practice pieces can be smoothed by standard techniques after being punched; however, smoothing may not be required. Metal jigs 52 include a plurality of slots 56 to facilitate in the formation of the metal jigs. FIG. 6 illustrates the formed metal jig. Typically, the instruction manual includes an explanation on how to form the metal jigs. The metal jigs are used to assist in accurately clamping together metal pieces 62 during the formation of a weld between a plurality of metal pieces 62. Practice metal sheet 50 is typically made of 14-gauge steel; however, other steel gauges can be used.

After the individual prepares the welding work surface, forms the metal jigs, punches out the metal practice pieces, and obtains any needed accessories not included in the welding kit, the individual is ready to begin practicing the formation of various types of welds. As can be appreciated, the welding kit can be designed to include all accessories necessary to use the welding kit. Typically, accessories such as wood blocks, clamps, brushes, hammers, files, rulers, squares, containers, grinders, helmets, gloves, goggles, glasses, caps, work outfits, paint, and the like, are not included in the welding kit. Prior to the forming of a weld, the individual is informed by the instruction manual about various welding techniques. The instruction manual provides information on the positioning of the welding gun for a particular type of welder. The instruction manual also provides welding tips when forming the weld. The instruction manual further explains what the weld will look like during welding and/or after welding. For certain types of welders, such as flux cored welders, the use of a positioning tip is described by the instruction manual during the formation of a weld. The instruction manual further provides information concerning the electrode selection for a particular welder and how to strike an arc for a particular welder.

After the individual reviews the basic operation of his/her particular welder, the individual is ready to practice forming particular types of welds. These welds generally include, but are not limited to, tack welds, butt welds, lap welds, fillet welds, edge welds, and plug welds. The instruction manual also provides detailed information on how to form these types of welds and the metal practice pieces recommended for use to form these types of welds.

Once the individual has sufficiently practiced the various types of welds, the individual selects one or more weld projects suggested in the instruction manual. Typically, the welding kit includes a sufficient number of metal sheets having a sufficient number of metal pieces to form at least two welding projects. The welding projects are generally classified by skill level (i.e. beginner, mintermediate, advanced). The instruction manual also typically includes several recommendations as to the combination of welding projects that can be completed from a particular welding kit.

After an individual selects a particular welding project, the instruction manual typically identifies the one or more metal sheets 60 that include the required metal pieces 62 to complete the welding project. The instruction manual also includes information and/or illustrations concerning how a particular metal piece needs to be deformed. Bending templates may also be included in the instruction manual. The instruction manual also includes instructions and tips on how to weld two or more metal pieces together and the recommended weld type to connect together the metal pieces.

Figure 10:
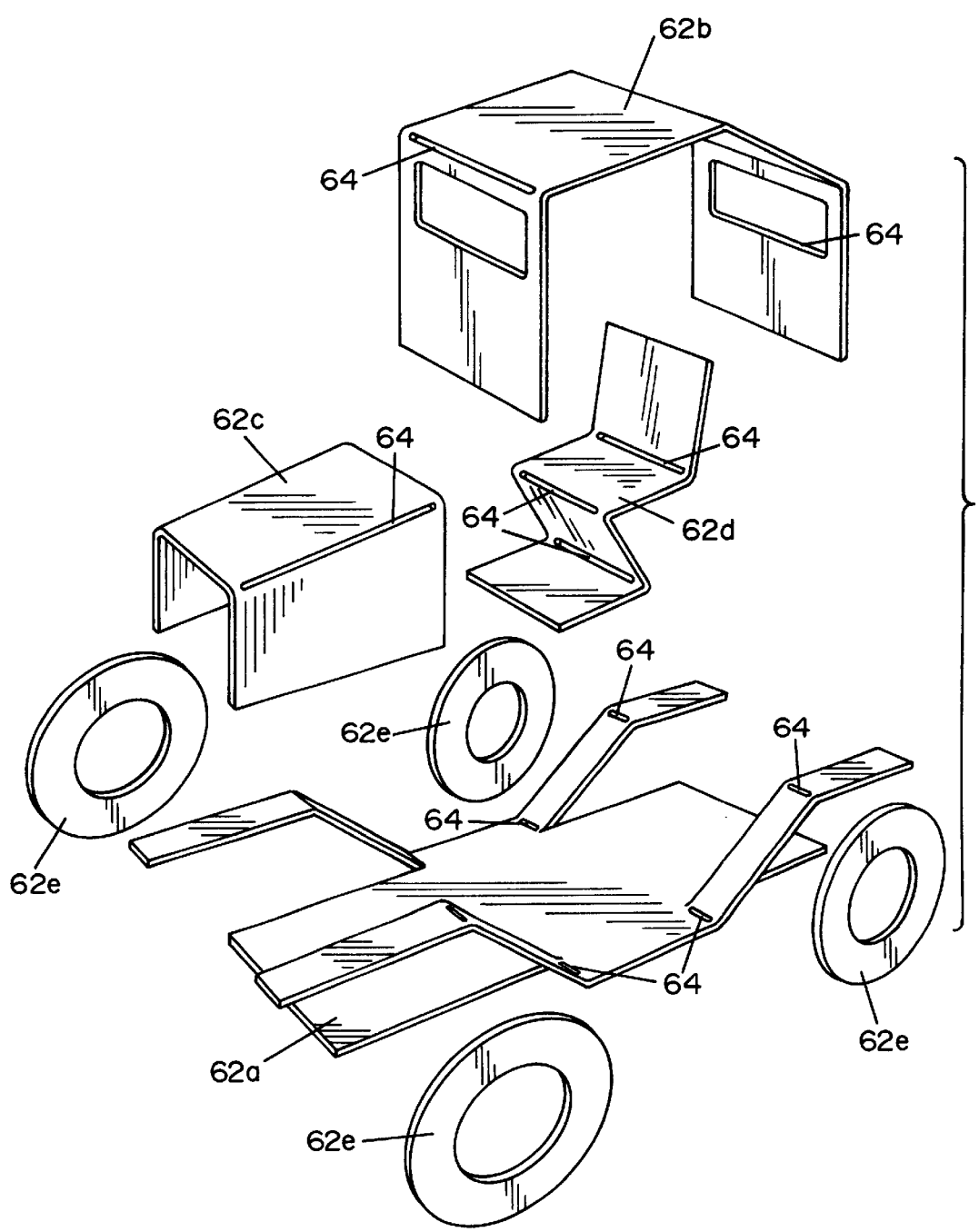
FIG. 10 is a perspective view of the plurality of metal project pieces of FIG. 9 that have been bent into final form prior to welding the pieces together; and, FIGS. 11A–11D illustrate the formation of one or more welds between two or more metal practice pieces to form the toy automobile project.

Referring now to FIGS. 9, 10 and 11A–11D, a toy automobile is formed from the metal pieces. As shown in FIG. 9, metal pieces 62a–e have been manually punched out from metal sheets 60, and the rough edges have been smoothed by standard techniques. Metal piece 62a is the base of the automobile, metal piece 62b is the passenger compartment of the automobile, metal piece 62c is the hood of the automobile, metal piece 62d the seat in the passenger compartment of the automobile, and metal piece 62e are the wheels of the automobile. Referring now to FIG. 10, metal pieces 62a–d have been bent to form a desired shape of the particular metal piece. Generally, the instruction manual includes a bending template and/or instructions as to how a particular metal piece should be bent. FIG. 10 also illustrates the approximate arrangement of the metal pieces to form the automobile. Typically, the instruction manual includes one or more illustrations as to how the metal pieces are oriented with respect to one another for a particular welding project.

Figure 11A:
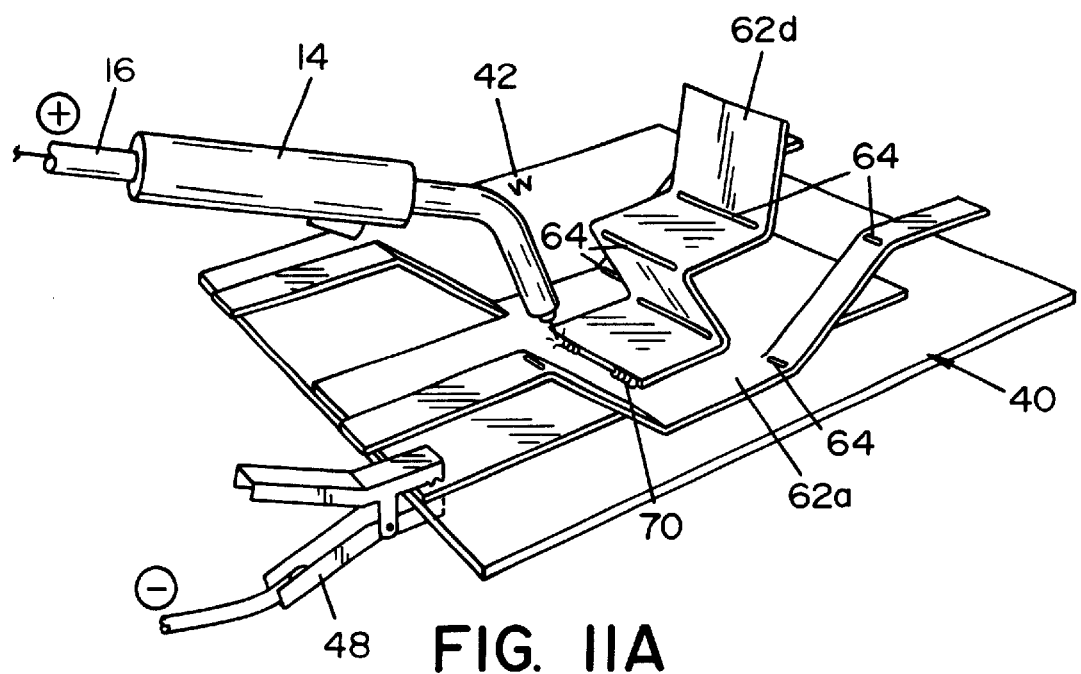
Figure 11B:
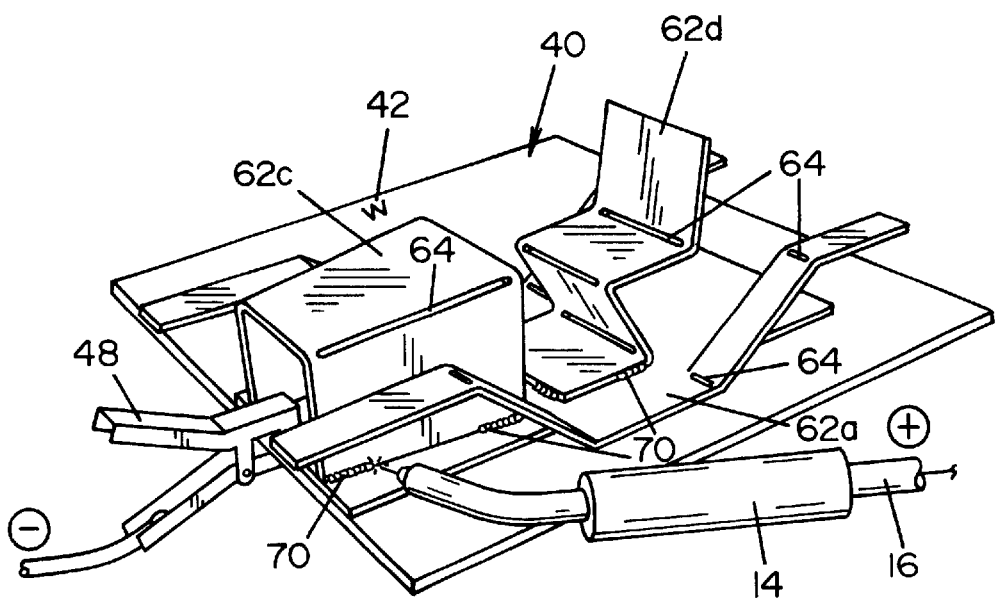
Figure 11C:
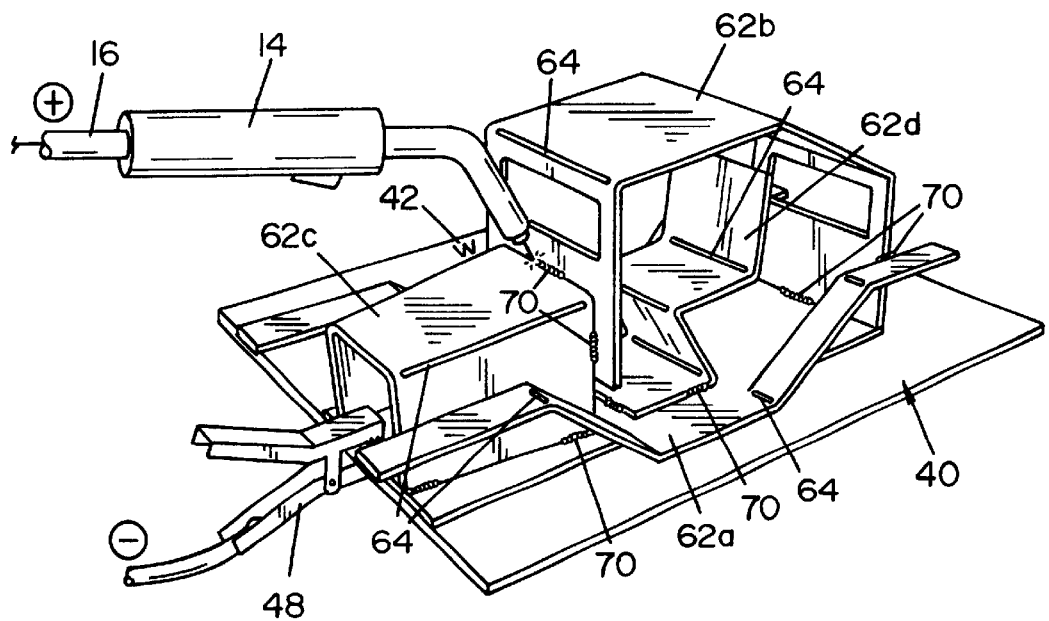
Figure 11D:
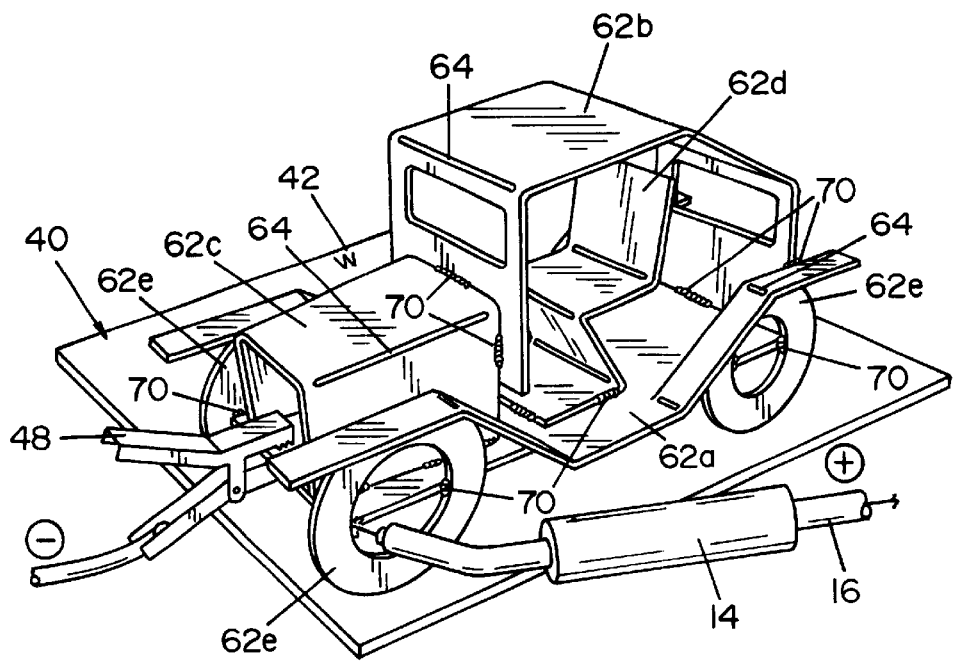

Referring now to FIGS. 11A–11D, the welding of the metal piece is shown. Referring to FIG. 11A, metal piece 62d is welded to metal piece 62e using a standard tack weld 70. As shown in FIG. 11A, ground clamp 48 is connected to metal piece 62a, and welding gun 14 is used to form weld 70 to connect metal piece 62b to metal piece 62a. Referring to FIG. 11B, metal piece 62c is tack welded to metal piece 62a. Ground clamp 48 is repositioned on metal piece 62a so that metal piece 62c can be properly positioned and connected to metal piece 62a. Instruction manual 30 typically includes information as to where weld 70 should be placed with respect to the metal pieces. Referring now to FIGS. 11C and 11D, the remaining components of the toy automobile are tack welded together. The instruction manual may include one or more templates to provide detail information concerning the metal piece orientation and/or weld location on one or more metal pieces. The instruction manual also typically provides information on how and when to use one or more jigs when connecting two or more metal components. Furthermore, the instruction manual typically includes information about the smoothing of the welds, removing spatter from the metal project and/or weld area, cleaning the metal surfaces, and/or painting the completed metal project.

Once an individual completes the weld projects in a particular welding kit, the individual can purchase other welding kits containing other welding projects.

The present invention has been described with reference to a number of different embodiments. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus described the invention, it is claimed:

1. A welding kit for an user of a welder to practice or improve his or her welding skills, said welding kit comprising at least one metal sheet and a welding instruction manual, said metal sheet including a plurality of partially pre-cut metal pieces to be connected together by at least one weld to form a welded object, a plurality of said partially pre-cut metal pieces at least partially defined in said metal sheet by a plurality of grooves, slots or combinations thereof in said metal sheet, said welding instruction manual including information on how to connect the workpiece by use of a welder, information on how to set up the workpiece prior to forming a weld bead, information on how to prepare a welding work area, information about one or more types of welds, information how to form one or more types of welds, information concerning the use of various metal sheets in the welding kit, information concerning the location of various metal pieces on one or more metal sheets in the welder kit, and information on one or more templates to illustrate how certain metal pieces are to be combined and/or welding locations to weld together two or more metal pieces, said welding instruction manual also including information selected from the group consisting of information relating to illustrations on how to make one or more practice projects using a plurality of metal pieces, information on the location of a weld on various metal pieces when practicing welds or forming a welding project, information on obtaining additional projects for use with the welding kit, information on one or more exercises on how to practice one or more types of welds, information on how to form one or more welding jigs, and combinations thereof.

2. The welding kit as defined in claim 1, wherein said plurality of grooves, slots or combinations thereof are formed by a process selected from the group consisting of stamping, etching, laser cutting, drilling, sawing, and combinations thereof.

3. The welding kit as defined in claim 2, including a plurality of said metal sheets.

4. The welding kit as defined in claim 3, wherein said plurality of metal sheets include a sufficient number of pre-cut metal pieces to form a plurality of said welded objects primarily made of metal.

5. The welding kit as defined in claim 4, wherein said welded object includes an object selected from the group consisting of a toy automobile, ornamental bookends, a toy airplane, an ornamental wine rack, an ornamental candle holder, an ornamental basket, and combinations thereof.

6. The welding kit as defined in claim 5, wherein said welding instruction manual includes information concerning welding safety, information on how to perform different types of welds and information on how to combine a plurality of metal pieces to form a welded object.

7. The welding kit as defined in claim 6, including a metal welding work surface, said metal work surface not including said partially pre-cut metal pieces.

8. The welding kit as defined in claim 7, including a plurality of metal jigs, said metal jigs adapted to hold at least one of said metal pieces in position when forming a weld on said metal piece.

9. The welding kit as defined in claim 8, wherein said metal jigs are partially cut out of at least one of said metal sheets.

10. The welding kit as defined in claim 9, including at least one metal piece to practice various types of welds, said metal piece to practice not adapted to form said welded object.

11. The welding kit as defined in claim 10, wherein a plurality of said metal practice pieces are partially cut out of at least one of said metal sheets.

12. The welding kit as defined in claim 11, wherein one of said metal sheets include an identifying marking to indicate that a plurality of said partially cut-out practice metal pieces and a plurality of said partially cut-out metal jigs are located on said metal sheet.

13. The welding kit as defined in claim 12, including a welding positioning tip, said positioning tip used in conjunction with a flux cored welder to assist in correctly positioning a welding gun when forming a weld on said metal pieces.

14. The welding kit as defined in claim 1, including a plurality of said metal sheets.

15. The welding kit as defined in claim 14, wherein said plurality of metal sheets include a sufficient number of pre-cut metal pieces to form a plurality of said welded objects primarily made of metal.

16. The welding kit as defined in claim 15, wherein said welded object includes an object selected from the group consisting of a toy automobile, ornamental bookends, a toy airplane, an ornamental wine rack, an ornamental candle holder, an ornamental basket, and combinations thereof.

17. The welding kit as defined in claim 16, wherein said welding instruction manual includes information concerning welding safety, information on how to perform different types of welds and information on how to combine a plurality of metal pieces to form a welded object.

18. The welding kit as defined in claim 17, including a metal welding work surface, said metal work surface not including said partially pre-cut metal pieces.

19. The welding kit as defined in claim 18, including a plurality of metal jigs, said metal jigs adapted to hold at least one of said metal pieces in position when forming a weld on said metal piece.

20. The welding kit as defined in claim 19, wherein said metal jigs are partially cut out of at least one of said metal sheets.

21. The welding kit as defined in claim 20, including at least one metal piece to practice various types of welds, said metal piece to practice not adapted to form said welded object.

22. The welding kit as defined in claim 21, wherein a plurality of said metal practice pieces are partially rut out of at least one of said metal sheets.

23. The welding kit as defined in claim 22, wherein one of said metal sheets include an identifying marking to indicate that a plurality of said partially cut-out practice metal pieces and a plurality of said partially cut-out metal jigs are located on said metal sheet.

24. The welding kit as defined in claim 23, including a welding positioning tip, said positioning tip used in conjunction with a flux cored welder to assist in correctly positioning a welding gun when forming a weld on said metal pieces.

25. The welding kit as defined in claim 1, including a sufficient number of said pre-cut metal pieces to form a plurality of said welded objects primarily made of metal.

26. The welding kit as defined in claim 25, wherein said welded object includes an object selected from the group consisting of a toy automobile, ornamental bookends, a toy airplane, an ornamental wine rack, an ornamental candle holder, an ornamental basket, and combinations thereof.

27. The welding kit as defined in claim 4, wherein said welding instruction manual includes information concerning welding safety, information on how to perform different types of welds and information on how to combine a plurality of metal pieces to form a welded object.

28. The welding kit as defined in claim 27, including a metal welding work surface, said metal work surface not including said partially pre-cut metal pieces.

29. The welding kit as defined in claim 28, including a plurality of metal jigs, said metal jigs adapted to hold at least one of said metal pieces in position when forming a weld on said metal piece.

30. The welding kit as defined in claim 29, wherein said metal jigs are partially cut out of at least one of said metal sheets.

31. The welding kit as defined in claim 30, including at least one metal piece to practice various types of welds, said metal piece to practice not adapted to form said welded object.

32. The welding kit as defined in claim 31, wherein a plurality of said metal practice pieces are partially cut out of at least one of said metal sheets.

33. The welding kit as defined in claim 32, wherein one of said metal sheets include an identifying marking to indicate that a plurality of said partially cut-out practice metal pieces and a plurality of said partially cut-out metal jigs are located on said metal sheet.

34. The welding kit as defined in claim 33, including a welding positioning tip, said positioning tip used in conjunction with a flux cored welder to assist in correctly positioning a welding gun when forming a weld on said metal pieces.

35. The welding kit as defined in claim 25, including a plurality of metal jigs, said metal jigs adapted to hold at least one of said metal pieces in position when forming a weld on said metal piece.

36. The welding kit as defined in claim 1, wherein said welding instruction manual includes information concerning welding safety, information on how to perform different types of welds and information on how to combine a plurality of metal pieces to form a welded object.

37. The welding kit as defined in claim 36, including a metal welding work surface, said metal work surface not including said partially pre-cut metal pieces.

38. The welding kit as defined in claim 37, including a plurality of metal jigs, said metal jigs adapted to hold at least one of said metal pieces in position when forming a weld on said metal piece.

39. The welding kit as defined in claim 38, including at least one metal piece to practice various types of welds, said metal piece to practice not adapted to form said welded object.

40. The welding kit as defined in claim 1, including a metal welding work surface, said metal work surface not including said partially pre-cut metal pieces.

41. The welding kit as defined in claim 40, wherein said metal welding work surface includes an identifying marking that uniquely identifies said metal welding work surface.

42. The welding kit as defined in claim 40, including a plurality of metal jigs, said metal jigs adapted to hold at least one of said metal pieces in position when forming a weld on said metal piece.

43. The welding kit as defined in claim 42, including at least one metal piece to practice various types of welds, said metal piece to practice not adapted to form said welded object.

44. The welding kit as defined in claim 1, including a plurality of metal jigs, said metal jigs adapted to hold at least one of said metal pieces in position when forming a weld on said metal piece.

45. The welding kit as defined in claim 44, including at least one metal piece to practice various types of welds, said metal piece to practice not adapted to form said welded object.

46. The welding kit as defined in claim 1, including at least one metal piece to practice various types of welds, said metal piece to practice not adapted to form said welded object.

47. The welding kit as defined in claim 46, wherein a plurality of said metal practice pieces are partially cut out of at least one of said metal sheets.

48. The welding kit as defined in claim 47, wherein at least one of said practice pieces include an identifying marking that uniquely identifies said metal practice pieces.

49. The welding kit as defined in claim 46, wherein at least one of said metal practice pieces include an identifying marking that uniquely identifies said metal practice pieces.

50. The welding kit as defined in claim 1, including a welding positioning tip, said positioning tip used in conjunction with a flux cored welder to assist in correctly positioning a welding gun when forming a weld on said metal pieces.

51. A method of practicing or improving a welder's skill in forming one or more types of welds comprising:
  a) obtaining a welding kit, said welding kit comprising at least one metal sheet and a welding instruction manual, said metal sheet including a plurality of partially pre-cut metal pieces at least partially defined in said metal sheet by a plurality of grooves, slots or combinations thereof, said welding instruction manual including information concerning welding safety, information on how to perform different types of welds and information on how to combine a plurality of metal pieces to form a welded object;
  b) removing a plurality of said partially pre-cut metal pieces from said at least one metal sheet;
  c) orientating a plurality of said pre-cut metal pieces as set forth in said welding instruction manual; and
  d) forming a weld bead between at least two of said metal pieces to at least partially form said metal object.

52. The method as defined in claim 51, wherein said welding instruction manual further includes a plurality of information selected from the group consisting of information on recommended welder settings for one or more welders used with the welder kit, information on striking an arc for one or more welders, information on how to set up the welder, information on how to connect the workpiece by use of a welder, information on how to set up the workpiece prior to forming a weld bead, information on how to prepare a welding work area, information about one or more types of welds, information how to form one or more types of welds, information on one or more exercises on how to practice one or more types of welds, information on how to form one or more welding jigs, information on the types of electrodes used with a particular welder when using the welding kit, information concerning the use of various metal sheets in the welding kit, information concerning the location of various metal pieces on one or more metal sheets in the welder kit, information on one or more templates to illustrate how certain metal pieces are to be combined and/or welding locations to weld together two or more metal pieces, information relating to illustrations on how to make one or more practice projects using a plurality of metal pieces, information on the location of a weld on various metal pieces when practicing welds or forming a welding project, information concerning sources to obtain additional welding information, information on obtaining additional projects for use with the welding kit, and combinations thereof.

53. The method as defined in claim 52, wherein said plurality of grooves, slots or combinations thereof are formed by a process selected from the group consisting of stamping, etching, laser cutting, drilling, sawing, and combinations thereof.

54. The method as defined in claim 53, including the step of orientating a plurality of said metal pieces together and forming at least one weld bead between said orientated metal pieces to form a welded metal object primarily made of metal.

55. The welding kit as defined in claim 53, wherein said welded object includes an object selected from the group consisting of a toy automobile, ornamental bookends, a toy airplane, an ornamental wine rack, an ornamental candle holder, an ornamental basket, and combinations thereof.

56. The method as defined in claim 55, including the step of removing a metal welding surface from said welding kit to provide a work surface for forming said weld bead between said metal pieces, said metal work surface not including said partially pre-cut metal pieces.

57. The method as defined in claim 56, including the step of removing a plurality of welding jigs contained in said welding kit.

58. The method as defined in claim 57, including the step of removing said welding jigs from at least one metal sheet, said metal sheet including a plurality of slots that define at least a portion of said welding jigs connected to said metal sheet.

59. The method as defined in claim 58, including the step of removing a plurality of metal practice pieces contained in said welding kit to practice various types of welds, said metal practice pieces not adapted to form said metal object.

60. The method as defined in claim 59, including the step of removing said metal practice pieces from at least one metal sheet and applying a practice weld bead to at least one of said metal practice pieces, said metal sheet including a plurality of slots that define at least a portion of said metal practice pieces connected to said metal sheet.

61. The method as defined in claim 60, wherein said metal sheets include separate and unique markings to identify said metal welding surface and the at least one metal sheets containing said welding jigs and said metal practice pieces.

62. The method as defined in claim 61 wherein said welding kit includes a welding positioning tip.

63. The method as defined in claim 52, including the step of removing a metal welding surface from said welding kit to provide a work surface for forming said weld bead between said metal pieces, said metal work surface not including said partially pre-cut metal pieces.

64. The method as defined in claim 52, including the step of removing a plurality of welding jigs contained in said welding kit.

65. The method as defined in claim 52, including the step of removing a plurality of metal practice pieces contained in said welding kit to practice various types of welds, said metal practice pieces not adapted to form said metal object.

66. The method as defined in claim 52, including the step of removing a welding positioning tip contained in said welding kit and inserting said welding tip in a welder prior to forming said weld bead between said metal pieces.

67. The method as defined in claim 51, wherein said plurality of grooves, slots or combinations thereof are formed by a process selected from the group consisting of stamping, etching, laser cutting, drilling, sawing, and combinations thereof.

68. The method as defined in claim 67, including the step of removing a metal welding surface from said welding kit to provide a work surface for forming said weld bead between said metal pieces, said metal work surface not including said partially pre-cut metal pieces.

69. The method as defined in claim 68, including the step of removing a plurality of welding jigs contained in said welding kit.

70. The method as defined in claim 69, including the step of removing a plurality of metal practice pieces contained in said welding kit to practice various types of welds, said metal practice pieces not adapted to form said metal object.

71. The method as defined in claim 51, including the step of orientating a plurality of said metal pieces together and forming at least one weld bead between said oriented metal pieces to form a welded metal object primarily made of metal.

72. The method as defined in claim 51, including the step of removing a metal welding surface from said welding kit to provide a work surface for forming said weld bead between said metal pieces, said metal work surface not including said partially pre-cut metal pieces.

73. The method as defined in claim 72, including the step of removing a plurality of welding jigs contained in said welding kit.

74. The method as defined in claim 73, including the step of removing a plurality of metal practice pieces contained in said welding kit to practice various types of welds, said metal practice pieces not adapted to form said metal object.

75. The method as defined in claim 72, including the step of removing a plurality of metal practice pieces contained in said welding kit to practice various types of welds.

76. The method as defined in claim 51, including the step of removing a plurality of welding jigs contained in said welding kit.

77. The method as defined in claim 76, including the step of removing said welding jigs from at least one metal sheet, said metal sheet including a plurality of slots that define at least a portion of said welding jigs connected to said metal sheet.

78. The method as defined in claim 77, including the step of removing a plurality of metal practice pieces contained in said welding kit to practice various types of welds, said metal practice pieces not adapted to form said metal object.

79. The method as defined in claim 51, including the step of removing a plurality of metal practice pieces contained in said welding kit to practice various types of welds, said metal practice pieces not adapted to form said metal object.

80. The method as defined in claim 79, including the step of removing said metal practice pieces from at least one metal sheet and applying a practice weld bead to at least one of said metal practice pieces, said metal sheet including a plurality of slots that define at least a portion of said metal practice pieces connected to said metal sheet.

81. The method as define in claim 51, including the step of removing a welding positioning tip contained in said welding kit and inserting said welding tip in a welder prior to forming said weld bead between said metal pieces.

82. A welding kit for an user of a welder to practice or improve his or her welding skills, said welding kit comprising a plurality of metal sheets, a metal work surface, and a welding instruction manual, at least one of said metal sheets including a plurality of partially pre-cut metal pieces adapted to be connected together by at least one weld to form a welded object, said partially pre-cut metal pieces at least partially defined in said metal sheet by a plurality of grooves, slots or combinations thereof in said metal sheet, at least one of said metal sheets including a plurality of partially pre-cut, pre-formed metal jigs, said metal work surface not including said partially pre-cut metal pieces or said partially pre-cut, pre-formed metal jigs, said welding instruction manual including information concerning welding safety, information on how to perform different types of welds and information on how to combine a plurality of metal pieces to form a welded object.

83. The welding kit as defined in claim 82, wherein said welding instruction manual includes a plurality of information selected from the group consisting of information on recommended welder settings for one or more welders used with the welder kit, information on striking an arc for one or more welders, information on how to set up the welder, information on how to connect the workpiece by use of a welder, information on how to set up the workpiece prior to forming a weld bead, information on how to prepare a welding work area, information about one or more types of welds, information how to form one or more types of welds, information on one or more exercises on how to practice one or more types of welds, information on how to form one or more welding jigs, information on the types of electrodes used with a particular welder when using the welding kit, information concerning the use of various metal sheets in the welding kit, information concerning the location of various metal pieces on one or more metal sheets in the welder kit, information on one or more templates to illustrate how certain metal pieces are to be combined and/or welding locations to weld together two or more metal pieces, information relating to illustrations on how to make one or more practice projects using a plurality of metal pieces, information on the location of a weld on various metal pieces when practicing welds or forming a welding project, information concerning sources to obtain additional welding information, information on obtaining additional projects for use with the welding kit, and combinations thereof.

84. The welding kit as defined in claim 83, wherein said plurality of partially pre-cut metal pieces adapted to form a plurality of said welded objects primarily made of metal, said welded objects include an object selected from the group consisting of a toy automobile, ornamental bookends, a toy airplane, an ornamental wine rack, an ornamental candle holder, an ornamental basket, and combinations thereof.

85. The welding kit as defined in claim 84, including at least one metal sheet that includes a plurality of partially pre-cut metal practice pieces adapted to practice weld bead formation, said plurality of metal practice pieces not adapted to form said metal object.

86. The welding kit as defined in claim 85, wherein said metal sheets include a unique identifying marking to indicate that a plurality of said partially pre-cut practice metal pieces and a plurality of said partially pre-cut, partially formed metal jigs are located on said metal sheet.

87. The welding kit as defined in claim 86, wherein said metal work surface includes a unique identifying marking.

88. The welding kit as defined in claim 87, including a welding positioning tip, said positioning tip used in conjunction with a flux cored welder to assist in correctly positioning a welding gun when forming a weld.

89. The welding kit as defined in claim 82, wherein said plurality of partially pre-cut metal pieces adapted to form a plurality of said welded objects primarily made of metal, said welded objects include an object selected from the group consisting of a toy automobile, ornamental bookends, a toy airplane, an ornamental wine rack, an ornamental candle holder, an ornamental basket, and combinations thereof.

90. The welding kit as defined in claim 89, including at least one metal sheet that includes a plurality of partially pre-cut metal practice pieces adapted to practice weld bead formation, said plurality of metal practice pieces not adapted to form said metal object.

91. The welding kit as defined in claim 90, wherein said metal sheets include a unique identifying marking to indicate that a plurality of said partially pre-cut practice metal pieces and a plurality of said partially pre-cut, partially formed metal jigs are located on said metal sheet.

92. The welding kit as defined in claim 91, including a welding positioning tip, said positioning tip used in conjunction with a flux cored welder to assist in correctly positioning a welding gun when forming a weld.

93. The welding kit as defined in claim 82, including at least one metal sheet that includes a plurality of partially pre-cut metal practice pieces adapted to practice weld bead formation, said plurality of metal practice pieces not adapted to form said metal object.

94. The welding kit as defined in claim 93, wherein said metal sheets include a unique identifying marking to indicate that a plurality of said partially pre-cut practice metal pieces and a plurality of said partially pre-cut, partially formed metal jigs are located on said metal sheet.

95. The welding kit as defined in claim 94, including a welding positioning tip, said positioning tip used in conjunction with a flux cored welder to assist in correctly positioning a welding gun when forming a weld.

96. The welding kit as defined in claim 82, wherein said metal work surface includes a unique identifying marking.

97. The welding kit as defined in claim 82, including a welding positioning tip, said positioning tip used in conjunction with a flux cored welder to assist in correctly positioning a welding gun when forming a weld.

* * * * *